C. S. AND C. A. COOK.
HOSE CLAMP.
APPLICATION FILED NOV. 12, 1921.
1,406,443.
Patented Feb. 14, 1922.
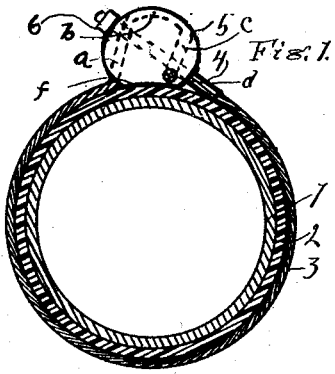
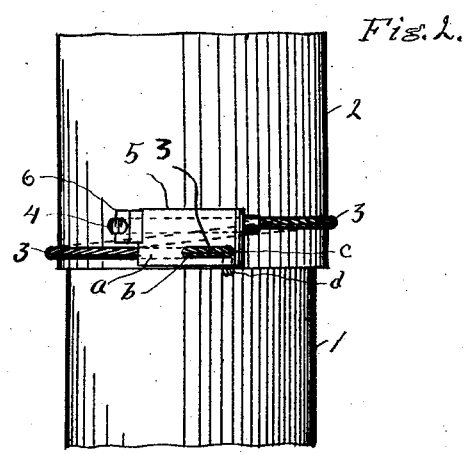
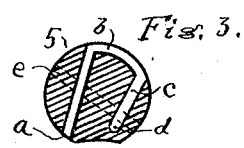
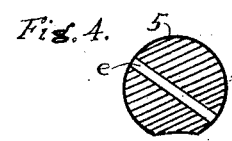
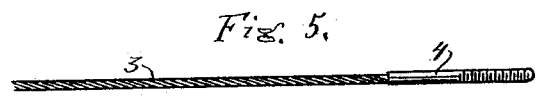
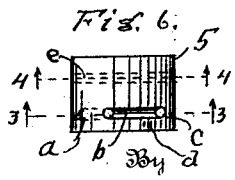
Inventor
Clifford S. Cook
Cleve A. Cook
Ithiel J. Cilley
Attorney

UNITED STATES PATENT OFFICE.

CLIFFORD SMITH COOK AND CLEVE ALTON COOK, OF SAND LAKE, MICHIGAN.

HOSE CLAMP.

1,406,443.   Specification of Letters Patent.   Patented Feb. 14, 1922.

Application filed November 12, 1921. Serial No. 514,602.

*To all whom it may concern:*

Be it known that we, CLIFFORD SMITH COOK and CLEVE ALTON COOK, citizens of the United States, residing at Sand Lake, in the county of Kent and State of Michigan, have invented certain new and useful Improvements in Hose Clamps, of which the following is a specification.

Our invention relates to improvements in appliances for securing flexible rubber hose to a standpipe, or other supporting element, and its object is to provide a means whereby a hose of any size or degree of resistance may be securely and safely clamped upon a corresponding standpipe, heavy gas pipe or other supporting element through which water is to be delivered into and through the hose.

We attain this object by the mechanism, and construction of parts shown in the accompanying drawing, in which Fig. 1 is a transverse sectional view of a supporting stand pipe, or gas pipe and a hose thereon, with our clamping device in place around the hose. Fig. 2 is a plan of the same showing a short length of the hose and the supporting pipe. Fig. 3 is a sectional elevation of our clamp head on the line 3—3 of Fig. 6 showing the course of the "tie" end of our enwrapping cable. Fig. 4 is a like view upon the line 4—4 of Fig. 6 showing the course of the screw threaded clip on the end of our clamping cable. Fig. 5 is a plan of the clamping or enwrapping cable and its screw threaded tip, and Fig. 6 is a plan of the clamping head detached from the hose and the cable.

Similar reference characters indicate similar parts throughout the several views.

In the accompanying drawing, 1 represents a metal supporting element, as a stand pipe, a large metal pipe, or their equivalent. 2 represents the hose placed upon the supporting element.

Our invention consists in the use of a very flexible metal cable, 3, which is intended to surround the hose, as indicated in Figs. 1 and 2, and our device for firmly clamping this cable around the hose consists of a metal clamping head 5. In applying this clamping head one end of the cable is passed upwardly through a hole $a$ to the opening $b$, and thence across this opening and downwardly through the hole $c$ and out at the end of the clamp, as at $d$, by which means the end of the cable is very firmly set in the head 5. The position of these receptacles is illustrated in dotted lines in Fig. 1, and shown in the openings $a$, $b$, $c$ and $d$ in Fig. 3, and also indicated in Fig. 6.

The other end of the cable 3 has a metal tip 4 securedly attached to it, as plainly shown in Figs. 1, 2 and 5, which said tip is provided with screw threads at its outer end for the reception of the nut 6. When applying this clamp the plain end of the cable is passed through the openings $a$, $b$ and $c$, as hereinbefore described, and the cable passed around the hose and the end 4 passed through the opening $e$, as indicated, and the nut 6 applied, as indicated in Figs. 1 and 2, and the cable drawn as closely around the hose as may be necessary. One of the main advantages gained by this clamp is that the bearing of the cable is made uniform upon all points of the hose where the cable bears, and this is greatly assisted by the concave bearing of the clamp head 5, which is made of a proper concavity to bear perfectly upon the surface of the hose, as indicated at $f$ in Fig. 1.

Another great advantage to be gained by the use of this clamp is that it may be applied and removed as frequently as desired without materially affecting the efficiency of the clamp, and it may be so firmly drawn into place with the nut 6 as to absolutely obviate any possibility of leakage between the surfaces of the supporting pipe and the hose, no matter what pressure may be necessary to overcome, a thing impossible without the use of a flexible clamping element, and means whereby said clamping element may be drawn very rigidly in place.

Having thus fully described our invention, what we claim as new in the art, is:

1. In a hose clamp, a clamping head having a hole formed upwardly, thence an opening across a segment of its periphery, thence a hole formed downwardly, thence a hole formed at an angle and opening at one end of the head, and having a second hole formed diagonally through the head a short distance back of the first named holes, a flexible cable having one end threaded through the first named holes, a metallic tip securely connected with the other end of the cable, said tip screw threaded and passed through the second named hole, and a nut thereon for securely binding the cable around a hose.

2. In combination with a hose and a hose supporting pipe, a clamp head having one point of its periphery concaved to correspond with the convexity of the hose, said head having irregular holes and bearings formed through and in it near one end, and a diagonal hole through it near the other end, a flexible cable having one end threaded through the first named holes, a metallic tip upon one end of said cable and screw threaded, the cable arranged to pass around the hose and pass the screw threaded tip through the diagonal hole in the head, and a nut screwed onto the tip drawing the cable firmly around the hose.

Signed at Sand Lake, Michigan, November 7, 1921.

CLIFFORD SMITH COOK.
CLEVE ALTON COOK.